US010850182B2

United States Patent
Kwan et al.

(10) Patent No.: US 10,850,182 B2
(45) Date of Patent: Dec. 1, 2020

(54) RESISTANCE STRAIN SHEET, SENSING ASSEMBLY, FORCE SENSOR AND SKATEBOARD

(71) Applicant: Ninebot (Beijing) Tech Co., Ltd., Beijing (CN)

(72) Inventors: Lai Ting Kwan, Beijing (CN); Yubin Yuan, Beijing (CN); Zhongyuan Chen, Beijing (CN)

(73) Assignee: Ninebot (Beijing) Tech Co., Ltd., Beijing (CN)

( * ) Notice: Subject to any disclaimer, the term of this patent is extended or adjusted under 35 U.S.C. 154(b) by 0 days.

(21) Appl. No.: 16/451,010

(22) Filed: Jun. 25, 2019

(65) Prior Publication Data

US 2020/0070037 A1 Mar. 5, 2020

(30) Foreign Application Priority Data

Aug. 31, 2018 (CN) .......................... 2018 1 1012420

(51) Int. Cl.
*A63C 17/12* (2006.01)
*A63C 17/01* (2006.01)
*G01L 1/22* (2006.01)

(52) U.S. Cl.
CPC ............ *A63C 17/12* (2013.01); *A63C 17/014* (2013.01); *G01L 1/2206* (2013.01)

(58) Field of Classification Search
CPC .. G01G 19/027; G01G 3/1402; G01G 19/025; G01G 19/44

See application file for complete search history.

(56) References Cited

U.S. PATENT DOCUMENTS

| 3,950,984 A * | 4/1976 | Russell ............... G01L 1/22 73/774 |
| 4,782,705 A * | 11/1988 | Hoffmann ........... G01L 1/2287 73/776 |
| 6,050,357 A | 4/2000 | Staelin et al. |
| 6,243,077 B1 * | 6/2001 | Manara ............... G06F 3/0213 345/157 |

(Continued)

FOREIGN PATENT DOCUMENTS

| CN | 105937981 A | 9/2016 |
| CN | 106092392 A | 11/2016 |

(Continued)

OTHER PUBLICATIONS

Extended European Search Report for corresponding EP patent application No. 19182933.2, dated Jan. 7, 2020.

*Primary Examiner* — John D Walters
*Assistant Examiner* — James J Triggs
(74) *Attorney, Agent, or Firm* — Gang Yu (57) ABSTRACT

An embodiment of the present disclosure provides a resistance strain sheet, a sensing assembly, a force sensor and a skateboard, wherein the resistance strain sheet includes: a strain sheet body; and a resistance wire, the strain sheet body having an symmetry axis, a plurality of resistance wires being provided, and the plurality of resistance wires being divided into two groups, the two groups of resistance wires are electrically connected to each other and symmetrically arranged on both sides of the symmetry axis, and each of the plurality of resistance wire being arranged at an acute angle with the symmetry axis.

20 Claims, 5 Drawing Sheets

(56) References Cited

U.S. PATENT DOCUMENTS

| | | | |
|---|---|---|---|
| 6,277,771 B1* | 8/2001 | Nishimura | B29C 70/22 |
| | | | 442/229 |
| 2006/0195197 A1* | 8/2006 | Clausen | A61B 5/112 |
| | | | 623/24 |
| 2009/0120208 A1 | 5/2009 | Meyer | |
| 2010/0063778 A1* | 3/2010 | Schrock | A61B 5/6807 |
| | | | 702/188 |
| 2014/0165744 A1 | 6/2014 | Lull et al. | |
| 2018/0074638 A1* | 3/2018 | Chiang | G06F 3/045 |
| 2018/0147478 A1 | 5/2018 | Wood | |

FOREIGN PATENT DOCUMENTS

| | | |
|---|---|---|
| CN | 1060080945 A | 11/2016 |
| CN | 205909783 U | 1/2017 |
| EP | 3239676 A1 | 11/2017 |
| JP | H06265419 A | 9/1994 |
| JP | 2000241234 A | 9/2000 |
| JP | 3209376 B2 | 9/2001 |
| JP | 3348941 B2 | 11/2002 |
| JP | 2006110330 A | 4/2006 |
| JP | 2018096757 A | 6/2018 |
| KR | 20180001773 A | 1/2018 |
| WO | 2017165448 A1 | 9/2017 |

* cited by examiner

RESISTANCE STRAIN SHEET, SENSING ASSEMBLY, FORCE SENSOR AND SKATEBOARD

TECHNICAL FIELD

The present disclosure relates to a field of sensor technology, and in particular, to a structural improvement of a resistance strain sheet of a force sensor.

BACKGROUND

Electric skateboards, as an emerging stepping tool, are increasingly favored by the users with the features of saving energy, rapid charging and convenient manipulation.

In order to improve the movement performance of the electric skateboard and satisfy the usage requirements of the user, the electric skateboard needs to have the functions of acceleration, deceleration and braking, and there are two kinds of existing electric skateboard; the implementation of the acceleration, deceleration and braking functions of one electric slide plate is completed by a remote control device operation in one of the two kinds of existing electric skateboard, this manipulating mode leads to a poor degree of intelligent manipulating of the electric skateboard, which is not helpful to improve the user's experience on the electric skateboard. The acceleration, deceleration and braking function of another electric skateboard of the two kinds of existing electric skateboard are regulated by user's stampede force detected by the force sensor, while the existing force sensor applied to the electric skateboard has a poor sensitivity of detecting the stampede force of the user, which leads to poor operation performance of the electric skateboard and also affects the user's good feeling of experience on usage of the electric skateboard.

SUMMARY

Some embodiments of the present disclosure provide a resistance strain sheet, an sensing assembly, a force sensor and a skateboard, so as to solve the problem in the related art that the operation performance of an electric skateboard is poor and affects user's good feeling of experience on usage of the electric skateboard.

In order to achieve the above object, a first embodiment of the present disclosure provides a resistance strain sheet including: a strain sheet body; a resistance wire, the strain sheet body having a symmetry axis, a plurality of the resistance wire being provided, and the plurality of resistance wires being divided into two groups; the two groups of resistance wires are electrically connected to each other and symmetrically arranged on both sides of the symmetry axis, and each of the plurality of resistance wires being arranged at an acute angle with the symmetry axis.

In an exemplary embodiment, the acute angle formed by the each of the plurality of resistance wires and the symmetry axis is 45 degrees.

A second embodiment of the present disclosure provides an sensing assembly including: a flexible connecting piece, the flexible connecting piece being provided with a plurality of connecting ends, and the flexible connecting piece being printed or etched with a wired structure; and a resistance strain sheet, each of the plurality of connection ends being provided with one resistance strain sheet, and the wired structure being electrically connected to each resistance strain sheet, and the resistance strain sheet being the above resistance strain sheet.

In an exemplary embodiment, the flexible connecting piece has four connecting ends, and each of the four connecting ends is provided with one resistance strain sheet.

A third embodiment of the present disclosure, provides a force sensor including: a strain member, the strain member having a plurality of strain detection regions; and a sensing assembly, a plurality of resistance strain sheets of the sensing assembly being disposed at, the plurality of strain detection regions in one-to-one correspondence to form a Wheatstone Bridge, the Wheatstone Bridge being configured to convert an variation of a resistance value generated by the resistance strain sheet into a voltage value and transmit the voltage value outwards, wherein the variation of resistance value generated by the each of the plurality of resistance strain sheets is generated by a steer strain at a corresponding strain detection region of the strain member, the sensing assembly is the above sensing assembly.

In an exemplary embodiment, the strain member is a stressed strain plate, an avoiding groove structure is provided on the stressed strain plate, the avoiding groove structure extends in a bending shape from an edge of the stressed strain plate to an interior of the stressed strain plate, and the avoiding groove structure surrounds a stressed region on the stressed strain plate, the each of the plurality of strain detection region and the stressed region are arranged at intervals and provided on two sides of a part of the channel of the avoiding groove structure, and the each of the plurality of strain detection region is located on a side, close to an edge of stressed strain plate, of the stressed region 13.

In an exemplary embodiment, the sensing assembly is adhered to a surface of the stressed strain plate by a flexible connecting piece, and a part of the flexible connecting piece passing through the avoiding groove structure is located inside the channel of the avoiding groove structure.

In an exemplary embodiment, the force sensor further includes a first mounting plate and a force transmission member, wherein the first mounting plate is located above the stressed strain plate, the force transmission member is arranged between the first mounting plate and the stress strain plate, and a first end face of the force transmission member is in contact with the stressed strain plate and is located in the stress region, and a second end face of the force transmission member is in contact with the first mounting plate.

In an exemplary embodiment, the force sensor further includes a fastener, the force transmission member is of a sleeve shape, and the first mounting plate is provided with a connecting hole and a first assembling hole, wherein the fastener is connected to the stressed strain plate after passing through the connecting hole and the force transmission member in sequence, and the first assembling hole is used for being passed through a connecting member adaptively connected to an external member.

In an exemplary embodiment, the force sensor further includes a second mounting plate, which is arranged between the first mounting plate and the stressed strain plate, wherein the second mounting plate is provided with an avoiding hole and a second assembling hole, and the stressed strain plate is provided with a third mounting hole, wherein the avoiding hole is used for avoiding the force transmission member, the second mounting hole corresponds to the third assembling hole for penetrating a connecting member adaptively connected to an external member.

In an exemplary embodiment, the force sensor further includes a supporting sleeve, the supporting sleeve, being arranged at the third assembling hole and located on a side, facing away from the second mounting plate, of the stressed strain plate.

In an exemplary embodiment, the sensing assembly is adhered to a surface of the stressed strain plate by the flexible connecting piece, the flexible connecting piece includes a connecting piece body and a plurality of connecting strips, wherein the plurality of connecting strips are arranged in one-to-one correspondence with the plurality of connecting ends each of the plurality of connecting strips is arranged between the connecting piece body and a corresponding connecting end in the plurality of connecting ends, so as to connect the connecting piece body and the corresponding connecting end; the each of the plurality of connecting strips has a bending portion, and the bending portion is located in a channel of the avoiding groove structure.

In an exemplary embodiment, the force sensor further includes a first mounting plate and a force transmission member, wherein the first mounting plate and the stressed strain plate are arranged at intervals, and the force transmission member is arranged between the first mounting plate and the stressed strain plate; a first end surface of the force transmission member is in contact with a surface of the stressed region, and a second end surface of the force transmission member is in contact with the first mounting plate.

A fourth embodiment of the present disclosure provides a skateboard, including a skateboard pedal and a wheel bridge, wherein the wheel bridge is arranged below the skateboard pedal, wherein the skateboard plate further includes a force sensor, the force, sensor is arranged between the skateboard pedal and the wheel bridge, and the force sensor is the force sensor described above.

With the technical solution of the present disclosure, by optimizing the structure of the resistance strain sheet, the two groups of resistance wires are electrically connected and symmetrically arranged on both sides of the symmetry axis, and the resistance wires are arranged at an acute angle with the symmetry axis. In this way, the shear strain of the resistance strain sheet corresponding to the strain member at the strain detection region is effectively measured, so that the depression force applied to the skateboard pedal by the user can be accurately measured, thereby facilitating obtaining the center of gravity position of the user by the magnitude of the depression force, facilitating the acceleration, deceleration and braking of the sliding panel, improving the intelligent operation degree of the skateboard greatly, and improving the user's good feeling of experience on the usage of the electric skateboard.

BRIEF DESCRIPTION OF THE DRAWINGS

The accompanying drawings, which form a part of the present disclosure, provide a further understanding of the present disclosure, and the schematic embodiments of the present disclosure and the description thereof are used to explain the present disclosure, and do not limit the present disclosure. In the drawings.

Herein, the drawings include the following drawing markers:

1, skateboard pedal; 2, wheel bridge; 3, force sensor; 10, stressed strain plate; 11, strain detection region; 12, avoiding groove structure; 13, stressed region; 14, third assembling hole; 20, sensing assembly; 21, resistance strain sheet; 211, strain sheet body; 212, resistance wire; 213, symmetry axis; 22, wired structure; 23, flexible connecting piece; 231, connecting end; 232, connecting piece body; 233, connecting strip; 30, first mounting plate; 31, connecting hole; 32, first assembling hole; 33, abdicating hole; 40, force transmission member; 50, fastener; 60, second mounting plate; 61, avoiding hole; 62, second assembling hole; 70, supporting sleeve.

DETAILED DESCRIPTION OF THE EMBODIMENTS

Hereinafter, the technical solutions in the embodiments of the present disclosure will be clearly and completely described with reference to the accompanying drawings in the embodiments of the present disclosure. Obviously, the described embodiments are merely a part of the embodiments of the present disclosure, rather than all the embodiments. The following description of at least one exemplary embodiment is practically merely illustrative, in no way limiting of the disclosure and its application or use. Based on the embodiments of the present disclosure, all other embodiments obtained by those skilled in the art without creative efforts belong to the scope of, protection of the present disclosure.

In order to solve the problem in the related art that the operation performance of the electric skateboard is poor and affects the user's good feeling of experience on the usage of the electric skateboard, the present disclosure provides a resistance strain sheet, an sensing assembly, a force sensor and a skateboard, wherein the sensing, assembly includes the resistance strain sheet, the force sensor has the above sensing assembly, and the skateboard is mounted with the above force sensor.

Figure 1:
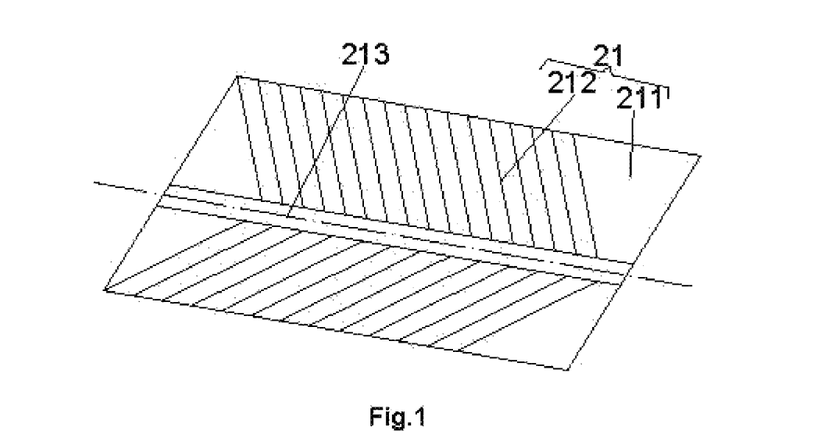
FIG. 1 illustrates a structural schematic diagram of a resistance strain sheet according to an alternative embodiment of the present disclosure.

As shown in FIG. 1 the resistance strain sheet 21 includes a strain sheet body 211 and a resistive wire 212, the strain sheet body 211 has a symmetry axis 213, a plurality of the resistance wires 212 being provided, and the plurality of resistance wires 212 are divided into two groups. The two groups of resistance wires 212 are electrically connected to each other and symmetrically arranged on both sides of the symmetry axis 213, and each of the resistance wires 212 is arranged at an acute angle with the symmetry axis 213.

In the present disclosure, by optimizing the structure of the resistance strain sheet, the two groups of resistance wires 212 are electrically connected and symmetrically arranged on both sides of the symmetry axis 213, and each of the resistance wires 212 are arranged at an acute angle with the symmetry axis 213. The stear strain of the resistance strain sheet 21 at the strain detection region is effectively measured, so that the depression force applied to the skateboard pedal by the user can be accurately measured, thereby obtaining the center of gravity position of the user by the magnitude of the depression force easily, facilitating the acceleration, deceleration and braking of the sliding panel, improving the intelligent operation degree of the skateboard greatly, and improving the user's good feeling of experience on the usage of the electric skateboard.

In an exemplary embodiment, the acute angle formed by the each of the plurality of resistance wire 212 and the symmetry axis 213 is 45 degrees.

Figure 2:
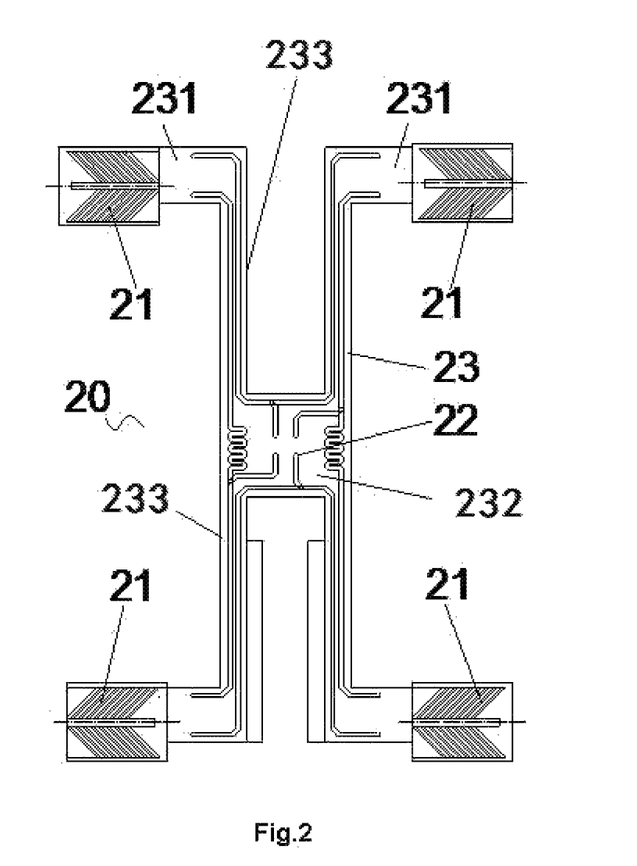
FIG. 2 illustrates a structural schematic diagram of a sensing assembly according to an alternative embodiment of the present disclosure.

As shown in FIG. 2, the sensing assembly 20 provided in the present disclosure includes a flexible connecting piece 23 and a resistance strain sheet 21, the flexible connecting piece 23 is provided with a plurality of connecting ends 231, the flexible connecting piece 23 is printed or etched with a wired structure 22, and each of the plurality of connection ends 231 is provided with one resistance strain sheet 21, the wired structure 22 is electrically connected to each resistance strain sheet 21, and the resistance strain sheet 21 is the above resistance strain sheet. The sensing assembly 20 having such a structure enables the resistance strain sheet 21 to be converted a variation of a resistance value generated by the resistance strain sheet 21 into a voltage value and transmit outwards smoothly, and furthermore, the flexible connecting piece 23 has a good deformation effect and is more advantageous for accommodating the deformation of the strain member of the force sensor. Furthermore, in an embodiment of the present disclosure, by providing the sensing assembly 20, the plurality of resistance strain sheets 21 are electrically connected by the flexible connecting sheet 23 printed or etched with the wired structure 22. In the related art, the plurality of resistance strain sheets 21 are electrically connected by the conductive wire or silica gel. In the present disclosure, it is beneficial for the sensing assembly 20 to be modularly arranged, so as to be adhesively mounted with the strain member, and the connection stability of the circuit is better.

In an exemplary embodiment, in order to make the sensing assembly 20 form a Wheatstone Bridge, the flexible connecting piece 23 has four connecting ends 231, and each of the four connecting ends 231 is provided with one resistance strain sheet 21. The provision of the wired structure 22 causes a variation of a resistance value generated by the resistance strain sheet 21 to be converted into a voltage value and transmit, outward smoothly.

Figure 7:
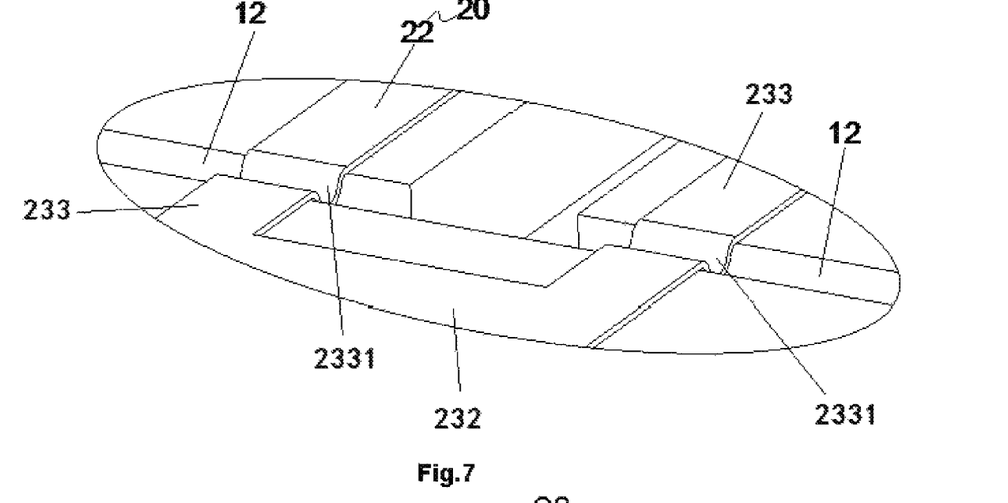
FIG. 7 illustrates an enlarged schematic diagram of the force sensor at B in FIG. 6.
Figure 8:
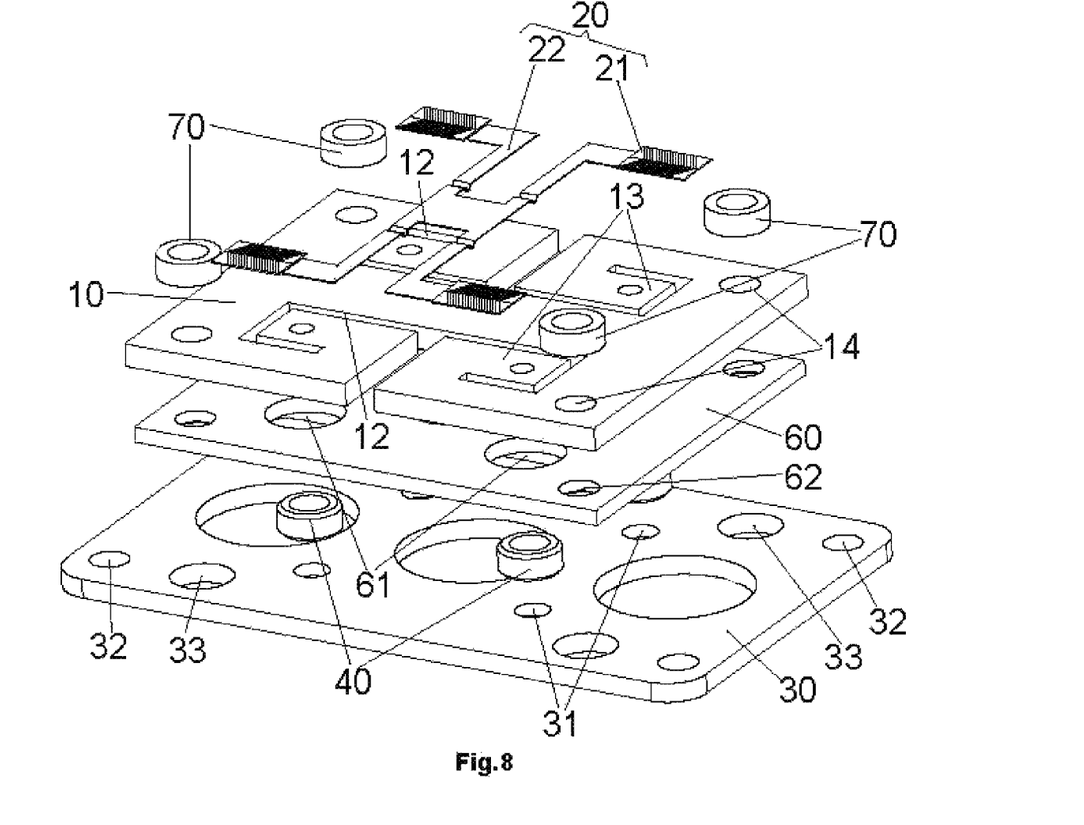
FIG. 8 illustrates an exploded structural schematic diagram of the force sensor in FIG. 6.

As shown in FIG. 7, the flexible connecting piece 23 is a PCB flexible wired board printed or etched with the wired structure 22, the PCB flexible wired board is adhered to a surface of the strain member, and a part of the PCB flexible wired board passing through the avoiding groove structure 12 of the strain member is located inside the channel of the avoiding groove structure 12. In this way, the part of the PCB flexible wired board located inside the channel of the avoiding groove structure 12 can make the wired structure 22 be subjected to a greater pulling force, and prevent the wired structure from being damaged by an excessive pulling force when a large deformation occurs due to the strain member, thereby improving the use stability of the force sensor.

In an exemplary embodiment, the sensing assembly is adhered to a surface of the stressed strain plate 10 by the flexible connecting piece 23, the flexible connecting piece 23 includes a connecting piece body 232 and a plurality of connecting strips 233, wherein the plurality of connecting strips 233 are arranged in one-to-one correspondence with the plurality of connecting ends 231; each of the plurality of connecting strips 233 is arranged between the connecting piece body 232 and a corresponding connecting end 231 in the plurality of connecting ends 231, so as to connect the connecting piece body 232 and the corresponding connecting end 231; the each of the plurality of connecting strips 233 has a bending portion 2331, and the bending portion 2331 is located in a channel for avoiding groove structure 12.

Figure 9:
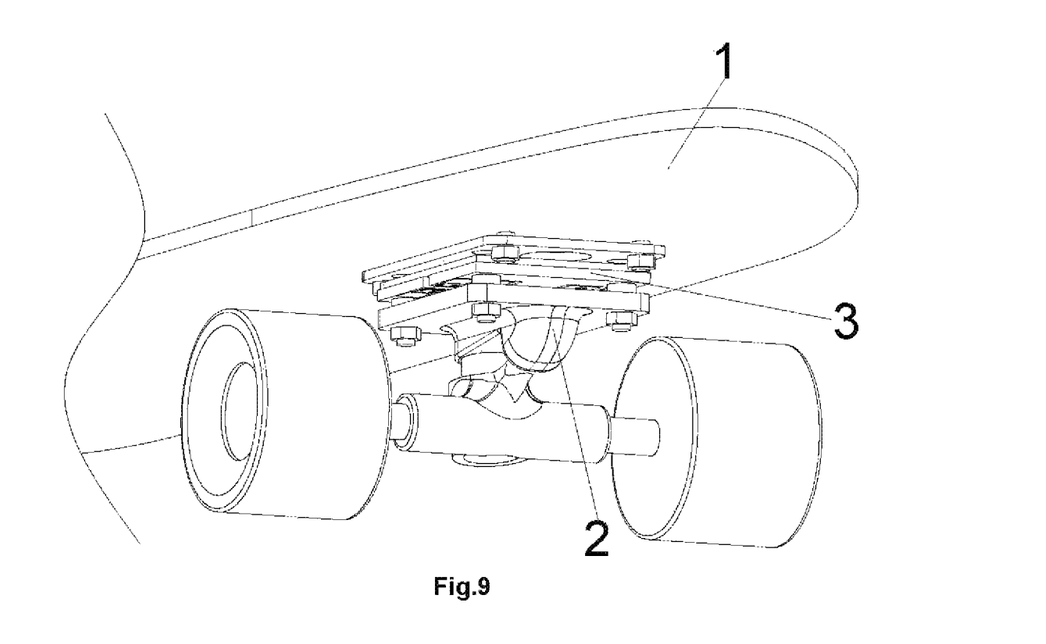
FIG. 9 illustrates a partial structural schematic diagram of a skateboard according to an alternative embodiment of the present disclosure.

The present disclosure further provides a force sensor 3 having the above structure of the sensing assembly 20 and a skateboard mounted with the above force sensor 3, wherein as shown in FIG. 9, the skateboard includes a skateboard pedal 1 and a wheel bridge 2, wherein the wheel bridge 2 is arranged below the skateboard pedal 1, and the skateboard further includes a force sensor 3; the force sensor 3 is provided between the skateboard pedal 1 and the wheel bridge 2, and the force sensor 3 is the force sensor 3 described above and described below. It should be noted that the skateboard of the present disclosure belongs to an electric skateboard, the electric skateboard has a skateboard pedal 1 and a plurality of wheel bridge 2 mounted on the skateboard pedal 1, a force sensor 3 is provided between each wheel bridge 2 and the skateboard pedal 1, and a plurality of force sensors 3 are used in combination.

By applying the force, sensor 3 to the skateboard, the skateboard can detect the change of the center of gravity of the user standing on the skateboard, so that the skateboard can be changed according to the center of gravity position of the user, and the function of acceleration, deceleration and braking is automatically realized, the intelligent operation degree of the skateboard is greatly improved, and improving the user's good feeling of experience on the usage of the electric skateboard.

In an exemplary embodiment, as shown in FIG. 3 to FIG. 8, the force sensor 3 includes a strain member and a sensing assembly 20, wherein the strain member has four strain detection regions 11, and the sensing assembly 20 includes four resistance strain sheets 21. The four resistance strain sheets 21 are arranged at the four strain detection regions 11 in one-to-one correspondence to form a Wheatstone Bridge, and the Wheatstone Bridge is used to convert a variation of resistance value generated by each of the plurality of resistance strain sheets 21 into a voltage value and transmit the voltage value outwards. The variation of resistance value generated by the each of the plurality of resistance strain sheets 21 is generated by a shear strain at a corresponding strain detection region 11 of the strain member.

It can be seen that the force sensor 3 provided by the present disclosure can effectively sense the stear strain of the strain member at the strain detection region 11 caused by the depression force of the skateboard pedal 1 by the user through the resistance strain sheet 21, so that the depression force applied to the skateboard pedal 1 by the user can be accurately measured, thereby facilitating obtaining the center of gravity position of the user by the magnitude of the depression force, facilitating the acceleration, deceleration and braking of the sliding panel.

Figure 3:
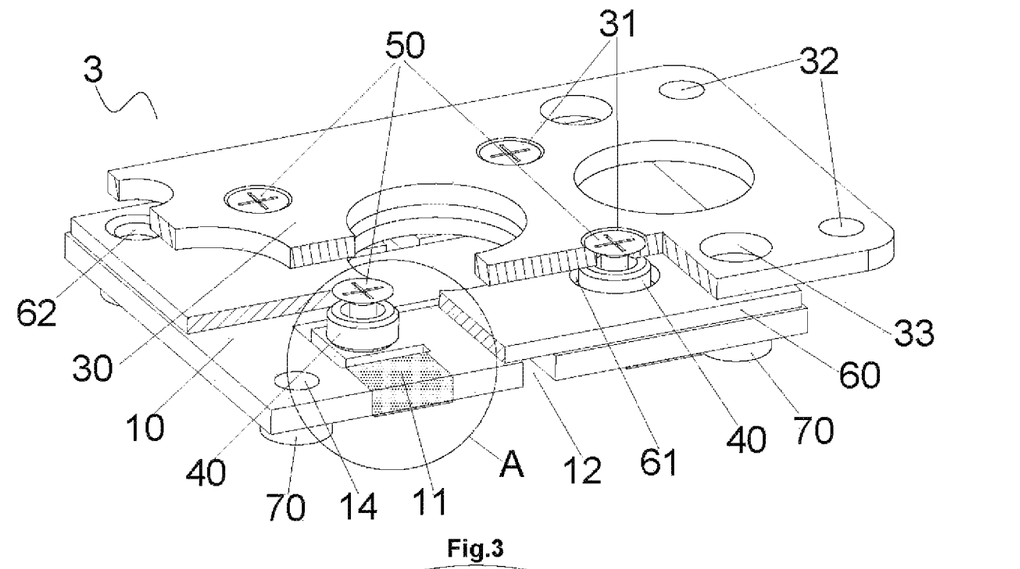
FIG. 3 illustrates a partial structural schematic diagram of cross-sectional diagram of a force sensor according to an alternative embodiment of the present disclosure.
Figure 4:
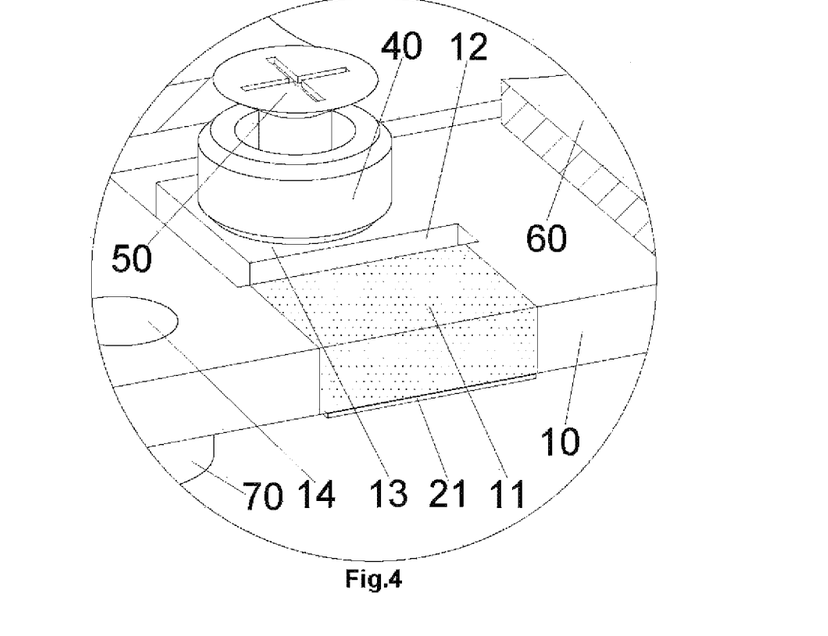
FIG. 4 illustrates an enlarged schematic diagram of the force sensor at A in FIG. 3.

In the embodiment illustrated by the figure of the present disclosure, as shown in FIGS. 3, 4 and 9, the resistance strain sheet 21 is used to detect the stear strain of the strain member at the strain detection, region 11. It can be seen that, in FIG. 4, the user stands on the skateboard pedal 1, and the strain detection region 11 of the strain member is subjected to a torsional force, and therefore, the stear strain generated by the strain member at the strain detection region 11 can be quickly measured by the strain sheet body 211 in the above-described structure.

In the present embodiment, as shown in FIG. 3 to FIG. 8, the strain member is a stressed strain plate 10, and the stressed strain plate 10 is provided with an avoiding groove structure 12, so that the avoiding groove structure 12 extends in a bending shape from an edge of the stressed strain plate 10 to an interior of the stressed strain plate 10. Furthermore, the groove structure 12 is configured to surround a stressed region 13 on the stressed strain plate 10, and each of the plurality of the strain detection region 11 and the stressed region 13 are arranged at intervals and provided on two sides of a part of a channel of the avoiding groove structure 12, and each of the plurality of the strain detection region 11 is located on a side, close to an edge of the stressed strain plate 10, of the stressed region 13. In this way, the structure of the strain member is reasonably optimized, and when a user stands on the skateboard pedal 1, a vertical force perpendicular to a surface of the stressed region 13 is acted on the stressed region 13 of the stressed strain plate 10. Due to the presence of the avoiding groove structure 12, a greater torsional force is generated at a position of the strain detection region 11, when the vertical force is transmitted to the position of the strain detection region 11 of the stressed strain plate 10, so that a greater steer strain is generated by the stressed strain plate 10. This just improves the sensitivity of the resistance strain sheet 21 detects the steer strain generated at the strain detection region 11.

Figure 5:
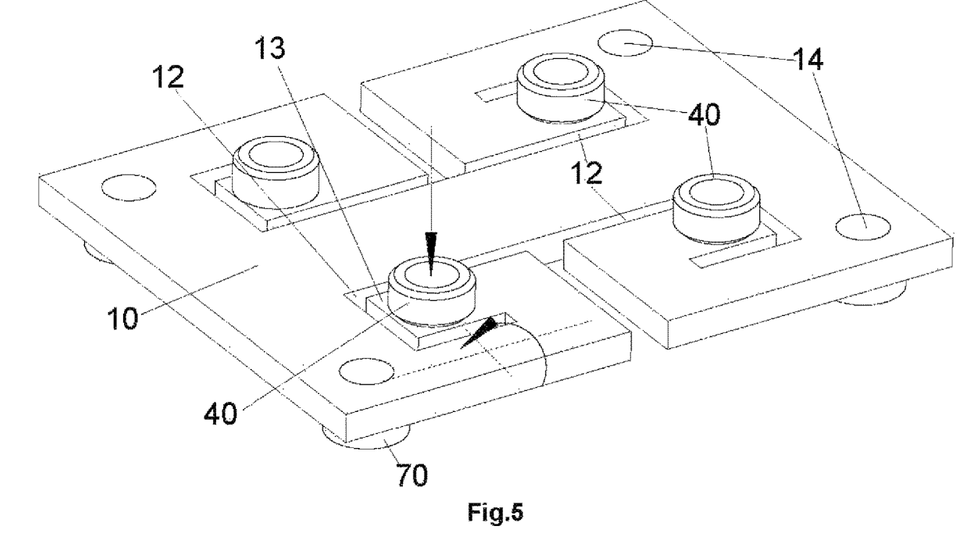
FIG. 5 illustrates a schematic diagram of the stress state at the strain detection region of the strain member of the force sensor in FIG. 3.
Figure 6:
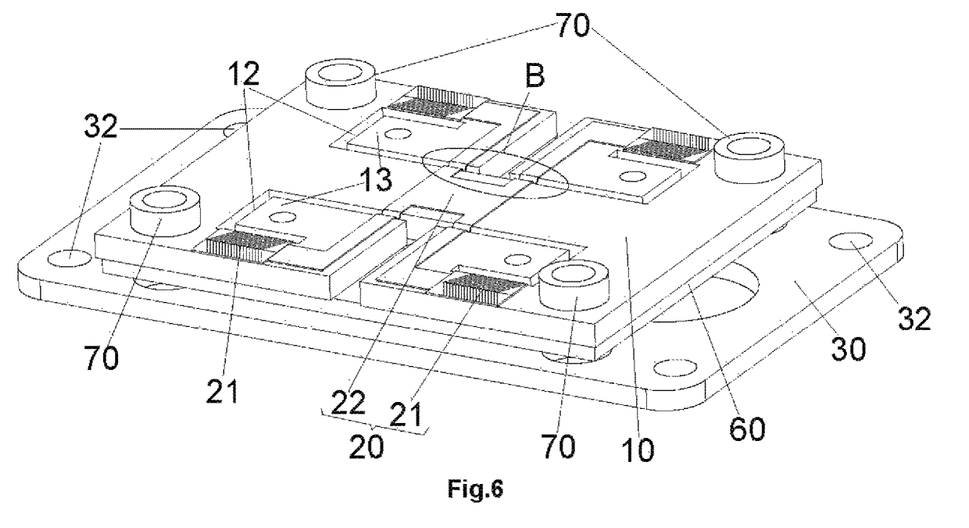
FIG. 6 illustrates a structural schematic diagram of another angle of the force sensor in FIG. 3.

As shown in FIGS. 3 to 5, the force sensor 3 further includes a first mounting plate 30 and a force transmission member 40, wherein the first mounting plate 30 is located above the stressed strain plate 10, and the force transmission member 40 is arranged between the first mounting plate 30 and the stressed strain plate 10. A first end face of the force transmission member 40 is in contact with the stressed strain plate 10 and is located in the stressed region 13, and the second end face of the force transmission member 40 is in contact with the first mounting plate 30. The arrangement of the first mounting plate 30 facilitates the mounting of the force sensor 3 on the bottom surface of the skateboard pedal 1, and the arrangement of the force transmission member 40 facilitates the transmission of force, thereby improving the detection sensitivity of the force sensor 3.

In an exemplary embodiment, the force sensor further includes a first mounting plate 30 and a force transmission member 40, the first mounting plate 30 and the stressed strain plate 10 are arranged at intervals, and the force transmission member 40 is arranged between the first mounting plate 30 and the stressed strain plate 10; the first end face of the force transmission member 40 is in contact with the surface of the stressed region 13, and a second end face of the force transmission member 40 is in contact with the first mounting plate 30.

As shown in FIG. 3, the force sensor 3 further includes a fastener 50, the force transmission member 40 is of a sleeve shape, and the first mounting plate 30 is provided with a connecting hole 31 and a first mounting hole 32, the fastener 50 is connected to the stressed strain plate 10 after passing through the connecting hole 31 and the force transmission member 40 in sequence, and the first assembling hole 32 is used for being passed through by a connecting member adaptively connected to the external member. After the fastener 50 passes through the connecting hole 31 and the force transmission member 40 in sequence, the fastener 50 is connected with the stressed strain plate 10, so that the first mounting plate 30, the force transmission member 40 and the stressed strain plate 10 can be stably assembled into one whole, thereby facilitating the integration design of the force sensor 3. Furthermore, the first mounting plate 30 and the skateboard pedal 1 can be reliably fastened and connected by a connecting member passed through the first mounting hole 32, so that the force sensor 3 accurately measures the stressed condition on the skateboard pedal 1.

As shown in FIGS. 3, 4, 6 and 8, the force sensor 3 further includes a second mounting plate 60, which is arranged between the first mounting plate 30 and the stressed strain plate 10, and an avoiding hole 61 and a second mounting hole 62 are arranged on the second mounting plate 60. The stressed strain plate 10 is provided with a third assembling hole 14, wherein the avoiding hole 61 is used for avoiding the force transmission member 40, and the second assembling hole 62 is corresponded to the third assembling hole 14 for being passed through by a connecting member adaptively connected to an external member. In this way, the connecting member can firmly connect the second mounting plate 60 and the stressed strain plate 10 together with the wheel bridge 2. In addition, the second mounting plate 60 can fill the space between the first mounting plate 30 and the stressed strain plate 10, and when the first mounting plate 30 and the stressed strain plate 10 are stressed and deformed, the second mounting plate 60 can support the first, mounting plate 30 and the stressed strain plate 10.

As shown in FIG. 3, the first mounting plate 30 is further provided with an abdicating hole 33, and the abdicating hole 33 is configured to allow a partial structure of a connecting member to pass through, and the partial structure of the connecting member is a structure passing through the second assembling hole 62 and the third assembly hole 14.

As shown in FIG. 3 to FIG. 6, in order to make the force sensor 3 spaced from the wheel bridge 2 and avoid the force sensor 3 from being subjected to contact interference, the force sensor 3 further includes a supporting sleeve 70, the supporting sleeve 70 is disposed at the third assembling hole 14 and located on a side, facing away from the second mounting plate 60, of the stressed strain plate 10.

It should be noted that the terminology used herein is for the purpose of describing particular embodiments only and is not intended to limit the exemplary embodiments according to the present application. As used herein, the singular forms are also intended to include the plural forms unless the context clearly dictates otherwise, and it should also be understood that when the terms "comprising" and/or "including" are used in this description, it indicates the presence of features, steps, operations, devices, components, and/or combinations thereof.

Unless specifically stated otherwise, the relative arrangements, numerical expressions, and numerical values of the components and steps set forth in these embodiments do not limit the scope of the disclosure. Meanwhile, it should be understood that, for convenience of description, the dimensions of the various portions shown in the figures are not drawn according to actual proportional relationships. Technologies, methods, and devices known to those of ordinary skill in the relevant art may not be discussed in detail, but unless otherwise specified, the techniques, methods, and devices should be considered part of the authorized description. In all examples shown and discussed herein, any particular value should be construed as merely exemplary and not limiting. Accordingly, other examples of exemplary embodiments may have different values. It should be noted that: Similar reference signs and letters denote similar terms in the following figures, and therefore, once a certain term is defined in one figure, no further discussion thereof is needed in the following figures.

In the description of the present disclosure, it should be understood that the azimuth or positional relationships indicated by <azimuth words such as 'front, rear, upper, lower, left, right', 'lateral, vertical, vertical, horizontal', and 'top, bottom', are generally based on the azimuth or positional relationships shown in the figures. For the convenience of description and simplification of the present disclosure, these azimuth words do not indicate and imply that the indicated device or element must have a specific orientation or be constructed and operated in a specific orientation, and therefore cannot be construed as limiting the scope of protection of the present disclosure; The azimuth word 'inner and outer' refers to inner and outer contours relative to the respective components themselves.

For convenience of description, spatially relative terms such as "above", "above", "above", "on", "above", etc. may be used herein to describe spatial positional relationships of one device or feature to other devices or features as shown in the figures. It should be understood that spatial relative terms are intended to encompass different orientations in use or operation other than the orientation of the device depicted in the figures. For example, if the devices in the figures are inverted, the devices described as 'above' or 'above' other devices or configurations will be positioned as 'below' or 'below' other devices or configurations. Accordingly, the exemplary term "above" may include both orientations "above" and "below". The device may also be positioned in other different ways (rotated 90 degrees or in other orientations), and corresponding explanation of the spatial relative descriptions used herein is made.

It should be noted that the terms "first" and "second" and the like in the description and claims of the present application and the figures described above are used to distinguish similar objects, and do not need to be used to describe a specific order or a precedence order. It should be understood, that the data so used may be interchanged where appropriate, such that the embodiments of the present application described herein may be implemented in an order other than those illustrated or described herein.

The foregoing description is merely a preferred embodiment of the present disclosure, and is not intended to limit the present disclosure, and various changes and modifications may be made by those skilled in the art. Any modifications, equivalent replacements and improvements made within the spirit and principle of the present disclosure shall belong to the scope of protection of the present disclosure.

What is claimed is:

1. A resistance strain sheet, comprising:
a strain sheet body; and
a resistance wire, the resistance wire having a symmetry axis, a plurality of resistance wires being provided, and the plurality of resistance wires being divided into two groups, the two groups of the resistance wires being electrically connected to each other and symmetrically arranged on both sides of the symmetry axis, and each of the plurality of resistance wires being arranged at an acute angle with the symmetry axis.

2. The resistance strain sheet according to claim 1, wherein the acute angle formed by the each of the plurality of resistance wires and the symmetry axis is 45 degrees.

3. A sensing assembly, comprising:
a flexible connecting piece, the flexible connecting piece being provided with a plurality of connecting ends, and the flexible connecting piece being printed or etched with a wired structure; and
a resistance strain sheet, each of the plurality of connection ends being provided with one resistance strain sheet, and the wired structure being electrically connected to each resistance strain sheet, and the resistance strain sheet being the resistance strain sheet as claimed in claim 1.

4. A sensing assembly, comprising:
a flexible connecting piece, the flexible connecting piece being provided with a plurality of connecting ends, and the flexible connecting piece being printed or etched with a wired structure; and
a resistance strain sheet, each of the plurality of connection ends being provided with one resistance strain sheet, and the wired structure being electrically connected to each resistance strain sheet, and the resistance strain sheet being the resistance strain sheet as claimed in claim 2.

5. The sensing assembly according to claim 3, wherein the flexible connecting piece has four connecting ends, and each of the four connecting ends is provided with one resistance strain sheet.

6. The sensing assembly according to claim 4, wherein the flexible connecting piece has four connecting ends, and each of the four connecting ends is provided with one resistance strain sheet.

7. A force sensor, comprising:
a strain member, the strain member having a plurality of strain detection regions; and
a sensing assembly, a plurality of resistance strain sheets of the sensing assembly being disposed at the plurality of strain detection regions in one-to-one correspondence to form a Wheatstone Bridge, the Wheatstone Bridge being configured to convert an variation of a resistance value generated by each of the plurality of resistance strain sheets into a voltage value and transmit the voltage value outwards, wherein the variation of resistance value generated by the each of the plurality of resistance strain sheets is generated by a shear strain at a corresponding strain detection region of the strain member, the sensing assembly is the sensing assembly as claimed in claim 3.

8. A force sensor, comprising:
a strain member, the strain member having a plurality of strain detection regions; and
a sensing assembly, a plurality of resistance strain sheets of the sensing assembly being disposed at the plurality of strain detection regions in one-to-one correspondence to form a Wheatstone Bridge, the Wheatstone Bridge being configured to convert an variation of a resistance value generated by each of the plurality of resistance strain sheets into a voltage value and transmit the voltage value outwards, wherein the variation of resistance value generated by the each of the plurality of resistance strain sheets is generated by a shear strain at a corresponding strain detection region of the strain member, the sensing assembly is the sensing assembly as claimed in claim 4.

9. A force sensor, comprising:
a strain member, the strain member having a plurality of strain detection regions; and
a sensing assembly, a plurality of resistance strain sheets of the sensing assembly being disposed at the plurality of strain detection regions in one-to-one correspondence to form a Wheatstone Bridge, the Wheatstone Bridge being configured to convert an variation of a resistance value generated by each of the plurality of resistance strain sheets into a voltage value and transmit the voltage value outwards, wherein the variation of resistance value generated by the each of the plurality of resistance strain sheets is generated by a shear strain at a corresponding strain detection region of the strain member, the sensing assembly is the sensing assembly as claimed in claim 5.

10. A force sensor, comprising:
a strain member, the strain member having a plurality of strain detection regions; and
a sensing assembly, a plurality of resistance strain sheets of the sensing assembly being disposed at the plurality of strain detection regions in one-to-one correspondence to form a Wheatstone Bridge, the Wheatstone Bridge being configured to convert an variation of a resistance value generated by each of the plurality of resistance strain sheets into a voltage value and transmit the voltage value outwards, wherein the variation of resistance value generated by the each of the plurality of resistance strain sheets is generated by a shear strain at a corresponding strain detection region of the strain member, the sensing assembly is the sensing assembly as claimed in claim 6.

11. The force sensor according to claim 7, wherein the strain member is a stressed strain plate, and an avoiding groove structure is provided on the stressed strain plate, the avoiding groove structure extends in a bending shape from an edge of the stressed strain plate to an interior of the stressed strain plate, and the avoiding groove structure surrounds a stressed region on the stressed strain plate, the each of the plurality of strain detection regions and the stressed region are arranged at intervals and provided on two sides of a part of a channel of the avoiding groove structure, and the each of the plurality of strain detection region is located on a side, close to an edge of the stressed strain plate, of the stressed region.

12. The force sensor according to claim 11, wherein the sensing assembly is adhered to a surface of the stressed strain plate by a flexible connecting piece, and a part of the flexible connecting piece passing through the avoiding groove structure is located inside the channel of the avoiding groove structure.

13. The force sensor according to claim 11, wherein the force sensor further comprises a first mounting plate and a force transmission member, wherein the first mounting plate is located above the stressed strain plate, the force transmission member is arranged between the first mounting plate and the stressed strain plate, and a first end face of the force transmission member is in contact with the stressed strain plate and is located in the stressed region, a second end face of the force transmission member is in contact with the first mounting plate.

14. The force sensor according to claim 13, wherein the force sensor further comprises a fastener, the force transmission member is of a sleeve shape, and the first mounting plate is provided with a connecting hole and a first assembling hole, wherein the fastener is connected to the stressed strain plate after passing through the connecting hole (31) and the force transmission member in sequence, and the first assembling hole is used for being passed through by a connecting member adaptively connected to an external member.

15. The force sensor according to claim 13, wherein the force sensor further comprises a second mounting plate, which is arranged between the first mounting plate and the stressed strain plate, wherein the second mounting plate is provided with an avoiding hole and a second assembling hole, and the stressed strain, plate is provided with a third assembling hole, wherein the avoiding hole is used for avoiding the force transmission member, the second assembling hole corresponds to the third assembling hole for being passed through by a connecting member adaptively connected with an external member.

16. The force sensor according to claim 15, wherein the force sensor further comprises a supporting sleeve, the supporting sleeve being arranged at the third assembling hole and located on a side, facing away from the second mounting plate, of the stressed strain plate.

17. The force sensor according to claim 11, wherein the sensing assembly is adhered to a surface of the stressed strain plate by the flexible connecting piece, and the flexible connecting piece comprises a connecting piece body and a plurality of connecting strips, wherein the plurality of connecting strips are arranged in one-to-one correspondence with the plurality of connecting ends; each of the plurality of connecting strips is arranged between the connecting piece body and a corresponding connecting end in the plurality of connecting ends, so as to connect the connecting piece body and the corresponding connecting end; the each of the plurality of connecting strips has a bending portion, and the bending portion is located in a channel of the avoiding groove structure.

18. The force sensor according to claim 11, wherein the force sensor further comprises a first mounting plate and a force transmission member, wherein the first mounting plate and the stressed strain plate are arranged at intervals, and the force transmission member is arranged between the first mounting plate and the stressed strain plate; a first end face of the force transmission member is in contact with a surface of the stressed region, and a second end face of the force transmission member is in contact with the first mounting plate.

19. A skateboard, comprising a skateboard pedal and a wheel bridge, wherein the wheel bridge is arranged below the skateboard pedal, wherein the skateboard further comprises a force sensor, the force sensor is arranged between the skateboard pedal and the wheel bridge, and the force sensor is the force sensor according to claim 7.

20. A skateboard, comprising a skateboard pedal and a wheel bridge, wherein the wheel bridge is arranged below the skateboard pedal, wherein the skateboard further comprises a force sensor, the force sensor is arranged between the skateboard pedal and the wheel bridge, and the force sensor is the force sensor according to claim 8.

* * * * *